United States Patent [19]

Ueno et al.

[11] 4,150,893

[45] Apr. 24, 1979

[54] APPARATUS FOR TAKING A PHOTOGRAPH AND METHOD THEREOF

[75] Inventors: Yoshikazu Ueno, Yokohama; Seiichi Hirano, Tokyo, both of Japan

[73] Assignee: Sony Corporation, Tokyo, Japan

[21] Appl. No.: 811,768

[22] Filed: Jun. 30, 1977

[30] Foreign Application Priority Data

Jul. 6, 1976 [JP] Japan .................................. 51-80125

[51] Int. Cl.² ............................................ G03B 27/52
[52] U.S. Cl. ...................................... 355/18; 354/80; 354/126; 354/292; 355/40; 355/70; 355/77
[58] Field of Search .................. 354/80, 81, 292, 126; 355/18, 40, 70, 72, 77, 75

[56] References Cited

U.S. PATENT DOCUMENTS

| | | | |
|---|---|---|---|
| 3,014,302 | 12/1961 | Hughes | 354/292 X |
| 3,119,301 | 1/1964 | Beattie et al. | 354/126 X |
| 3,947,112 | 3/1976 | Hahn et al. | 355/70 X |
| 3,967,301 | 6/1976 | Corning | 354/292 |

*Primary Examiner*—Richard A. Wintercorn
*Attorney, Agent, or Firm*—Lewis H. Eslinger; Alvin Sinderbrand

[57] ABSTRACT

An apparatus for photographically providing an exploded view of a plurality of parts to be assembled includes a plurality of support plates made of transparent material on which the plurality of parts to be photographed are located, light sources irradiating said plates and parts and a camera taking a photograph of said parts. In this case, the parts are so laid out on the support plates that they are not overlapped as viewed from the camera and the light sources are so disposed that the parts are irradiated by light therefrom all about the circumferences thereof.

Further, a method for taking a photograph of parts by using the above apparatus is also disclosed.

6 Claims, 2 Drawing Figures

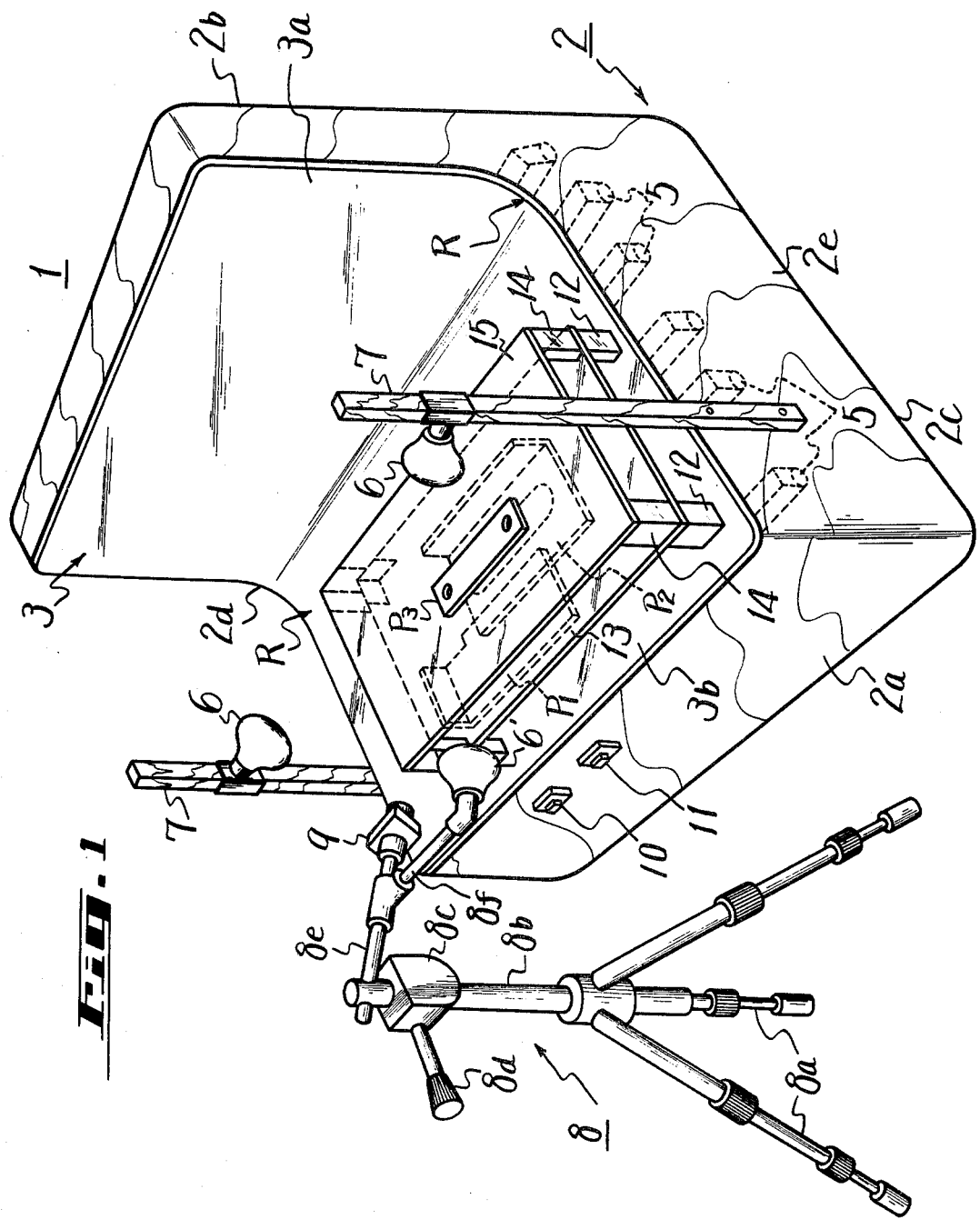

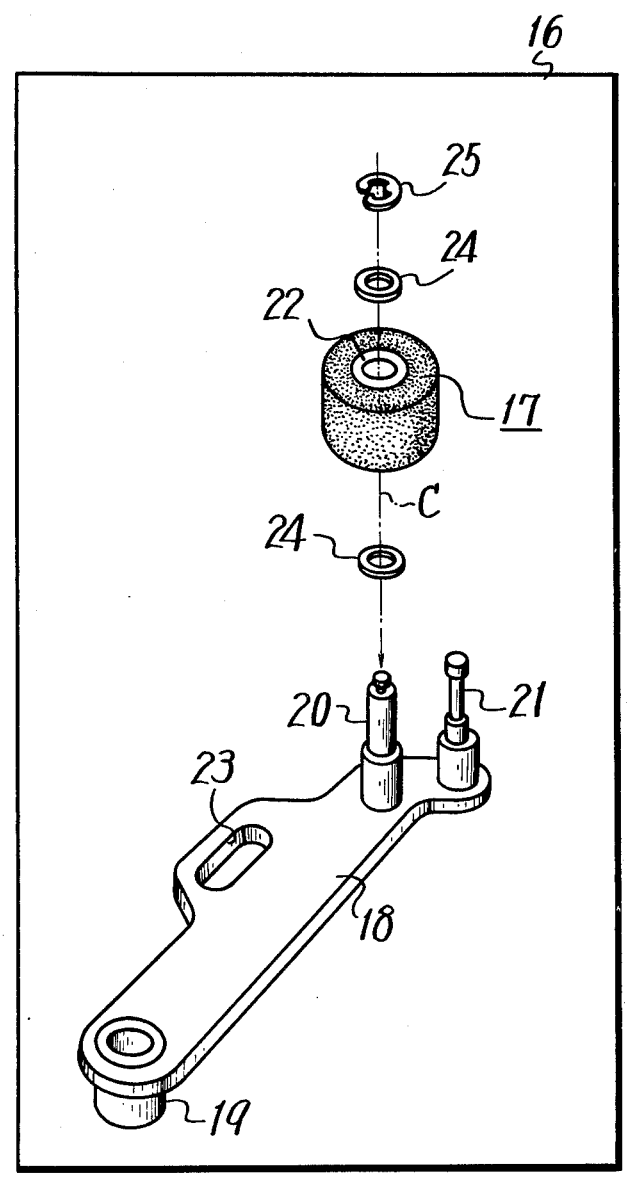

APPARATUS FOR TAKING A PHOTOGRAPH AND METHOD THEREOF

BACKGROUND OF THE INVENTION

1. Field of the Invention

The present invention relates generally to an apparatus for taking a photograph and a method thereof, and more particularly to a novel apparatus for taking a photograph and a method thereof suitable for use in photographically providing an exploded view of a plurality of parts to be assembled together.

2. Description of the Prior Art

In manufacturing or assembling various kinds of instruments such as a tape recorder, the manufacturing or assembling process is carried out sequentially in accordance with a partial assembly drawing, a total assembling drawing, a job instruction manual and so on. Some job instruction manuals have exploded perspective drawings which correspond to the and illustrate respective sequences assembling parts.

In the prior art, such exploded perspective drawings (which are hereinafter referred to simply as exploded drawings) are prepared manually by a skilled technical illustrator. Such prior art method requires a rather long time and is costly. Since the illustrator draws an exploded drawing of every main assembly, there is the possibility of errors appearing in the instructions for assembling the parts.

Therefore, instead of an exploded drawing manually prepared by an illustrator, it may be considered to take a photograph of the respective parts and to attach the photograph to a job instruction manual. In fact, however, since it is necessary to take a photograph of a number of parts at the same time, such parts may be overlapped partially and/or cast shadows on each other so that, if an assembler assembles the parts upon such a photograph, an error may occur. Further, it is rather difficult to take a photograph of a number of parts from a desired angle without any overlapping therebetween.

SUMMARY OF THE INVENTION

It is an object of the present invention to provide an apparatus for taking a photograph and a method thereof which is free from the defects of the prior art and which can provide the basis for an exploded drawing.

It is another object of the invention to provide an apparatus for taking a photograph and a method thereof with which an exploded perspective diagram can be made without requiring the services of a skilled person such as a technical illustrator.

It is a further object of the invention to provide an apparatus for taking a photograph and method thereof with which necessary information as to parts or materials to be assembled can be expressed accurately.

It is a further object of the invention to provide an apparatus for taking a photograph and method thereof by which an exploded drawing of parts to be assembled can be obtained with clear detail in and a three dimensional effect so that assembling of parts can be carried out smoothly even by an unskilled worker or assembler.

It is a further object of the invention to provide an apparatus for taking a photograph and method thereof with which parts to be photographed for assembly can be arranged without any overlap and at a desired angle to the line of sight without regard to their size and shape.

It is yet a further object of the invention to provide an apparatus for taking a photograph and method thereof with which a photograph of parts is taken with no shading.

According to an aspect of the present invention, an apparatus for taking a photograph comprises a cabinet having an opening at its upper side and a light source therein, a light scattering plate made of semi-transparent material covering said opening of said cabinet, a plurality of spacers, each being made of transparent material and movably located on said light scattering plate, at least one plate made of transparent material and detachably located on said spacers, an external light source irradiating said transparent plate, and a camera; and the parts to be photographed are located on said light scattering plate and said transparent plate in such a manner that said parts are not overlapped when viewed from said camera.

According to another aspect of the invention there is further provided a method of taking a photograph which comprises the steps of preparing a light scattering plate with a light source thereunder, locating a plurality of transparent spacers on said light scattering plate, disposing a first part to be photographed on said light scattering plate, locating a plate of transparent material on said spacers, disposing a second part to be photographed on said transparent plate, arranging said first and second parts such that said parts are not overalapped when viewed through a finder of said camera, and irradiating said first and second parts with light from all about the circumferences thereof.

BRIEF DESCRIPTION OF THE DRAWINGS

FIG. 1 is a schematic perspective view of an apparatus for taking a photograph according to the present invention; and FIG. 2 is a plan view of a photosensitive sheet on which an exploded view of parts to be assembled is printed by the invention.

DESCRIPTION OF THE PREFERRED EMBODIMENT

An example of an apparatus for taking a photograph and method thereof according to the present invention will be described with reference to the drawings.

In FIG. 1 which schematically shows an example of the apparatus for taking a photograph according to the invention, 1 generally designates a base frame on which parts to be photographed may be disposed. This base frame 1 consists of a cabinet 2, which is formed of a front plate 2a, back plate 2b, bottom plate 2c and left and right side plates 2d and 2e, each being made of an opaque material such as wool, and a light scattering plate 3, which is made of semi-transparent material such as white acrylic resin or frosted glass and attached to the opening of cabinet 2. In this case, both of the left and right side plates 2d and 2e of cabinet 2 are substantially L-shaped as viewed from the side. The light scattering plate 3 is fixed to the upper edges of side plates 2d and 2e of cabinet 2. In this case, curved portions R are provided on side plates 2d and 2e so that the light scattering plate 3 consists a front portion 3a and plain portion 3b (on which parts to be photographed may be located) which are connected continuously along the curved portions R by a curved portion, whereby plate 3 is L-shaped as a whole. Within the cabinet 2 there is provided a light source such as a plurality of fluorescent lamps 5 located parallel with one another for illuminating the outside of cabinet 2 through the light scattering plate 3.

Further, a plurality of light sources such as illumination lamps 6 and 6' and located for facing the upper portion or plain portion 3b of light scattering plate 3 or, more particularly, for illuminating parts to be photographed and their circumferences uniformly as described later. The illumination lamps 6 and 6, which are located at the opposite sides of front portion 3b of light scattering plate 3, are supported by posts 7 and 7, which are attached to side plates 2d and 2e of cabinet 2 at symmetrical positions and which are extended upwards therefrom. The lamps 6 and 6' are shown to be slidable on post 7 and 7' for adjusting their upper and lower positions, respectively.

It is also possible that the size and shape of base frame 1 can be varied suitably in accordance with those of parts to be photographed. However, by way of example, frame 1 may have a width of about 2 m. and depth of about 1.5 m. Of course, the height up to plain portion 3b, the total height, size and so on of base frame 1 can be selected suitably.

In the illustrated example of the invention shown in FIG. 1, a camera supporter such as a tripod 8 is located in front of base frame 1 to support a camera 9 and hence to take various photographs. In this case, the camera supporter or tripod 8 has three legs 8a, a main slide shaft 8b, a universal support or joint 8c, an operating knob 8d and a rod 8e by which the camera 9 is held. The camera 9 is attached to the front end of rod 8e to which a rod support 8f is coupled. This rod 8f serves to support lamp 6' detachably near the camera 9. On the front plate or panel 2a of cabinet 2 there are provided switches 10 and 11 for the internal lamps 5 and external lamps 6, respectively.

Now, the method of taking a photograph according to the invention will be described. At first, a plurality of parts to be assembled are located on the plain portion 3b of light scattering plate 3 in such a manner that when the parts are viewed through the finder of camera 9 the respective parts are not overlapped with one another. In this case, in the finder there are provided cross lines or the like, for example, indication lines in column and row directions, respectively. After the portions of the parts to be engaged with each other, for example, the corresponding portions of attaching screw bores, have been aligned in the to assembling order, the parts are photographed to provide an exploded diagram. The film, on which a photograph is taken, is called a specific photosensitive sheet, e.g. FUJITAX $\beta$ FILM (TRADE NAME), and subjected to a necessary process. Thereafter, the film is additionally inscribed with instruction lines for assembling the parts, and with illustrations of other parts such as screws, washers and so on.

Next, the means for arranging the parts to be photographed or lay out means will be described. In FIG. 1, $P_1$ $P_2$ and $P_3$ are parts to be assembled and hence to be photographed. The lowest part $P_1$ is placed on the plain or carrying portion 3b of light scattering plate 3, and then the intermediate part $P_2$ is placed obliquely behind and above the part $P_1$. In the illustrated embodiment, four spacers 12, each being made of transparent material such as glass or acrylic resin, are disposed on the carrying portion 3b and a plate 13 made of transparent material is placed on spacers 12. The part $P_2$ is located on the upper surface of transparent plate 13. Similarly, four spacers 14 made of transparent material are disposed on the transparent plate 13 and then a plate 15 made of transparent material in placed on the spacers 14. The upper most part $P_3$ is then placed on the transparent plate 15. In this case, the parts $P_1$, $P_2$ and $P_3$ are so arranged or laid out that they are not overlapped when viewed through the finder of camera 9.

Upon taking a photograph of the parts $P_1$, $P_2$ and $P_3$, the respective lamps 6 and 6' are so adjusted in position that when they are lit no shadows are cast on the parts $P_1$, $P_2$ and $P_3$. Thus, a desired exploded photograph can be taken by the camera 9. In this case, it should be noted that, since the spacers 12, 14 and plates 13, 15 are all transparent, their images are not photographed on a film. In this case, it is better that the lamps 5 in the cabinet 2 are lit before laying out the parts $P_1$, $P_2$, $P_3$ and so on.

Other layout means for the parts to be photographed may be considered besides the above example. By way of example, if parts to be photographed are light in weight and small in size they can be suspended by yarns made of transparent material such as nylon. If, for example, transparent parts and semi-transparent parts to be photographed, they may be previously coated with opaque paints; or, if specific portions, contours and so on of parts to be photographed are desired to be clarified or emphasized, and depending upon the shape thereof, the portions in question may be coated with paints such as poster-color, crayon pastel, powder or the like to enhance the contrast of images thereof on a photograph. If parts to be located on the transparent plate are unstable by reason of their configuration, magnets may be used (when the parts are made of magnetic material) to hold the parts in position or clay or adhesive may be used to fix the parts. In the case where magnets are used, the same should be disposed at positions not viewed from the camera 9.

Thereafter, the tripod 8 is adjusted to determine the angle of camera 9 and then a photograph of the parts is taken by camera 9 on a film therein. After the film is developed, the image appearing on the film is printed on, for example, a FUJITAX $\beta$ FILM (Trade name) on an enlarged scale. Thereafter, instruction lines for assembling the parts, small parts interposed between the photographed parts and/or other necessary instructions, if any, are inscribed on the thus prepared exploded photograph.

Since it is easy to inscribe information on and erase the same from FUJITAX $\beta$ FILM which is used to print the image thereon, it is easy to remove unnecessary informations therefrom or when instruction lines, letters and so on are overlapped on the images of parts they can be made white for clear contrast. Further, even if the size, shape and so on of parts to be photographed are varied, the parts can be easily photographed by varying the positions and size and so on of the transparent spacers and plates.

FIG. 2 is a front view of a specific photosensitive sheet such as a FUJITAX $\beta$ FILM on which there is printed an exploded view of a pinch roller and a pinch lever of a tape recorder. In FIG. 2, 16 indicates a photosensitive sheet, 17 a pinch roller, and 18 a pinch lever of a tape recorder, respectively. At the base portion of pinch lever 18 there is provided a sleeve 19 integrally therewith, which may engage with the supporting shaft of the chassis of the tape recorder (not shown). The right end portion of pinch lever 18 is bent to the right, and on the bent portion there are planted a pivot shaft 20 with a step for receiving pinch roller 17 and a tape guide shaft 21, respectively. In this case, the order for assembling the pinch roller 17 to the pivot shaft 20 is indicated on the photosensitive sheet 16 as requiring that a metal collar 22 (made of, for example, oilless metal) provided around the center bore of pinch roller 17 is rotatably engaged on the pivot shaft 20 to its upper stepped portion and then fixed. In the exploded photograph, 23 designates a slot provided through pinch lever 18 with which a pin for shifting the pinch lever 18 is engaged.

In the illustrated exploded view, the pinch roller 17 and pinch lever 18 are actually photographed on a film after being suitably arranged in their positional relation in the manner mentioned above; and their images on the film are printed on the photosensitive sheet 16 in an enlarged scale. Then, a one-dotted line C with an arrow for attaching the pinch roller 17 to the pivot shaft 20 with a step, and images of two washers 24 to be contacted with the upper and lower surfaces of pinch roller 17 and a snap ring 25 to be fixed to the top end of pivot shaft 20 are inscribed on the photosensitive sheet 16. The thus prepared photosensitive sheet 16 is adhered to a part of a manuscript which will become the previously mentioned job instruction manual, and then the whole manuscript is printed to provide copies of the job instruction manual. If the copies are delivered to predetermined places on the assembling line, they can serve as the conventional job instruction manual. In such a kind of instruction manual there are inscribed essential points, notes and so on for partial assembling.

According to the present invention described above, the following advantages can be achieved as compared with the prior art.

a. The number of required experts such as technical illustrators can be greatly reduced, and the number of processes to prepare an exploded perspective drawing can be reduced.

b. The necessary instructions for parts to be assembled (in some cases, materials to be worked) can be expressed accurately.

c. Since the exploded drawing of parts to be assembled is rich in the perspective sense, even an assembler of the lowest class can easily understand the assembling procedure.

d. Since the exploded drawing (exploded photograph) can be prepared rapidly, the efficiency with which assembly lines are brought into production can be enhanced.

The above description refers to an apparatus for taking a photograph according to the present invention and to an exploded photograph produced by the apparatus of the invention. There is no need to limit the camera to an ordinary camera for taking a photograph of parts to be assembled, but it is possible that the parts are photographed by a camera of, for example, an industrial video tape recorder and video sheet recorder and recorded on the tape and sheet as a still picture, and then the still picture is reproduced at a respective assembling station as instructions therefor.

Although only a single preferred embodiment of the invention, is described above, it will be apparent that many modifications and variations could be effected by one skilled in the art without departing from the spirit or scope of the invention as determined by the appended claims.

We claim as our invention

1. An apparatus for photographically providing an exploded perspective view of a plurality of parts to be assembled, comprising:
    a cabinet having an opening at its upper side and a light source therein;
    a light scattering plate made of semi-transparent material and covering said opening of said cabinet to support at least one of said parts;
    a plurality of spacers, each being made of transparent material and movably located on said light scattering plate;
    at least one plate made of transparent material and detachably located on said spacers to support another one of said parts;
    light source means irradiating said plate of transparent material; and
    a camera for photographing said parts with said parts being located on said light scattering plate and said transparent plate in such a manner that they are not overlapped when viewed from said camera.

2. An apparatus according to claim 1, in which said cabinet includes left and right side plates of L-shaped configuration, and said light scattering plate includes substantially horizontal and vertical portions secured to respective portions of said side plates.

3. An apparatus according to claim 2, in which said horizontal and vertical portions are coupled by a curved portion.

4. An apparatus according to claim 1, in which said light source means irradiating said plate of transparent material includes two lamps which are attached to posts fixed to left and right side plates of said cabinet.

5. An apparatus according to claim 1, further comprising a plurality of second spacers made of transparent material and located movably on said transparent plate and a second plate made of transparent material and located on said second spacers to support still another of said parts.

6. A method of photographically providing an exploded perspective view of a plurality of parts to be assembled, comprising the steps of:
    preparing a light scattering plate with a light source thereunder;
    locating a plurality of spacers, each being made of transparent material, on said light scattering plate;
    disposing a first part of said parts to be assembled on said light scattering plate;
    locating a plate made of transparent material on said spacers;
    disposing a second part of said parts to be assembled on said transparent plate;
    arranging said first and second parts such that said parts are not overlapped when viewed through a finder of a camera;
    irradiating said first and second parts with light about all the circumferences thereof; and photographing the arranged parts by means of said camera.

* * * * *